US012383836B2

United States Patent
Desgarennes et al.

(10) Patent No.: US 12,383,836 B2
(45) Date of Patent: Aug. 12, 2025

(54) IMPORTING AGENT PERSONALIZATION INSTANTIATE A PERSONALIZED AGENT IN A USER GAME SESSION

(71) Applicant: Microsoft Technology Licensing, LLC, Redmond, WA (US)

(72) Inventors: Gabriel A. Desgarennes, Issaquaah, WA (US); William B. Dolan, Kirkland, WA (US); Christopher John Brockett, Kirkland, WA (US); Sudha Rao, Bothell, WA (US); Benjamin David Van Durme, Baltimore, MD (US); Ryan Volum, Seattle, WA (US); Hamid Palangi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 255 days.

(21) Appl. No.: 17/855,389

(22) Filed: Jun. 30, 2022

(65) Prior Publication Data

US 2023/0381664 A1 Nov. 30, 2023

Related U.S. Application Data

(60) Provisional application No. 63/345,216, filed on May 24, 2022.

(51) Int. Cl.
*A63F 13/00* (2014.01)
*A63F 13/58* (2014.01)
(Continued)

(52) U.S. Cl.
CPC .............. *A63F 13/67* (2014.09); *A63F 13/58* (2014.09); *A63F 13/73* (2014.09); *A63F 13/79* (2014.09);
(Continued)

(58) Field of Classification Search
CPC .......... A63F 13/67; A63F 13/58; A63F 13/73; A63F 13/79; A63F 2300/6027; G06F 21/105; G06F 21/1077; G06N 5/043
See application file for complete search history.

(56) References Cited

U.S. PATENT DOCUMENTS

2007/0260567 A1\* 11/2007 Funge ..................... A63F 13/67
706/47
2008/0045283 A1 2/2008 Stamper
(Continued)

FOREIGN PATENT DOCUMENTS

| WO | 2018004839 A1 | 1/2018 |
| WO | 2020252400 A1 | 12/2020 |
| WO | 2021003471 A1 | 1/2021 |

OTHER PUBLICATIONS

"International Search Report and Written Opinion Issued in PCT Application No. PCT/US23/023263", Mailed Date: Oct. 30, 2023, 17 Pages.
(Continued)

*Primary Examiner* — Nathaniel E Wiehe
*Assistant Examiner* — Ross A Williams

(57) ABSTRACT

Aspects of the present disclosure relate to a personalized agent service that generates and evolves customized agents that can be instantiated in-game to play with users. Machine learning models are trained to control the agent's interactions with the game environment and the user during gameplay. A user may request that a personalized agent join the user's gameplay session. The user device sends a request for the personalized agent to a game platform. The game platform determines whether the user has a license to execute a second instance of the game. When the user has a license to execute a second instance of the game, the second instance of the game may be executed on the user device. Information received from a personalized agent service is
(Continued)

used to instantiate a personalized agent in the second instance of the game.

8 Claims, 11 Drawing Sheets

(51) Int. Cl.
    *A63F 13/67*         (2014.01)
    *A63F 13/73*         (2014.01)
    *A63F 13/79*         (2014.01)
    *G06F 21/10*         (2013.01)
    *G06N 5/043*        (2023.01)

(52) U.S. Cl.
    CPC ........... *G06F 21/105* (2013.01); *G06N 5/043* (2013.01); *A63F 2300/6027* (2013.01); *G06F 21/1077* (2023.08)

(56) References Cited

U.S. PATENT DOCUMENTS

| | | |
|---|---|---|
| 2013/0108994 A1 | 5/2013 | Srinivasa |
| 2018/0359172 A1 | 12/2018 | Yadav |
| 2019/0005029 A1 | 1/2019 | Mills et al. |
| 2019/0108448 A1 | 4/2019 | O'Malia |
| 2019/0197402 A1 | 6/2019 | Laszlo |
| 2020/0042295 A1 | 2/2020 | Straub |
| 2020/0137463 A1 | 4/2020 | Kumar et al. |
| 2020/0197811 A1* | 6/2020 | Eatedali ................. G06N 3/02 |
| 2021/0012113 A1 | 1/2021 | Petill et al. |
| 2021/0174801 A1 | 6/2021 | Back |
| 2021/0358489 A1 | 11/2021 | Hussain |
| 2021/0374863 A1 | 12/2021 | Zarlengo |
| 2022/0035640 A1 | 2/2022 | Daei |
| 2022/0088474 A1 | 3/2022 | Dicken |
| 2023/0123535 A1 | 4/2023 | Dolan et al. |
| 2023/0124765 A1 | 4/2023 | Desgarennes et al. |
| 2023/0125036 A1 | 4/2023 | Volum |
| 2023/0351661 A1 | 11/2023 | Gelfenbeyn |
| 2023/0381665 A1 | 11/2023 | Dolan |
| 2023/0405468 A1 | 12/2023 | Brockett |

OTHER PUBLICATIONS

Non-Final Office Action mailed on Jun. 4, 2024, in U.S. Appl. No. 17/855,417, 20 pages.
Non-Final Office Action mailed on Feb. 29, 2024, in U.S. Appl. No. 17/733,301, 20 pages.
Thriftwood, Major, "Leisure Suit Larry (PC/DOS) 1987, Sierra On-Line (AGI, EGA)", Retrieved From: https://www.youtube.com/watch?v=Fp0nfDW2iJo, Sep. 14, 2017, 3 Pages.
Kluwer, et al., "Talking NPCs in a Virtual Game World", In Proceedings of the ACL System Demonstrations, Jul. 13, 2010, pp. 36-41.
"International Search Report and Written Opinion Issued in PCT Application No. PCT/US22/046633", Mailed Date: Jan. 19, 2023, 12 Pages.
"International Search Report and Written Opinion Issued in PCT Application No. PCT/US22/046634", Mailed Date: Jan. 20, 2023, 12 Pages.
Mousavi, et al., "Deep Reinforcement Learning: An Overview", In Repository of arXiv:1806.08894v1, Jun. 23, 2018, 17 Pages.
"International Search Report and Written Opinion Issued in PCT Application No. PCT/US23/019020", Mailed Date: Sep. 4, 2023, 15 Pages.
"International Search Report and Written Opinion Issued in PCT Application No. PCT/US23/019022", Mailed Date: Sep. 4, 2023, 17 Pages.
"Invitation to Pay Additional Fee Issued in PCT Application No. PCT/US23/023263", Mailed Date: Sep. 6, 2023, 10 Pages.
"Black & White", Retrieved From: https://en.wikipedia.org/w/index.php?title=Black_%26_White_(video_game)&oldid=1083759441, Apr. 20, 2022, 21 Pages.
Bommasani, et al., "On the Opportunities and Risks of Foundation Models", In Repository of arXiv:2108.07258v1, Aug. 16, 2021, 211 Pages.
Florez-Puga, et al., "Query-Enabled Behavior Trees", In IEEE Transactions on Computational Intelligence and AI in Games, vol. 1, Issue 4, Dec. 1, 2009, pp. 298-308.
Guckelsberger, et al., "New and Surprising Ways to be Mean", In Proceedings of IEEE Conference on Computational Intelligence and Games, Aug. 14, 2018, pp. 1-8.
Parisotto, et al., "Actor-Mimic: Deep Multitask and Transfer Reinforcement Learning", In Repository of arXiv:1511.06342v4, Feb. 22, 2016, pp. 1-16.
"Invitation to Pay Additional Fees Issued in PCT Application No. PCT/US23/019020", Mailed Date: Jul. 14, 2023, 9 Pages.
"Invitation to Pay Additional Fees Issued in PCT Application No. PCT/US23/019022", Mailed Date: Jul. 12, 2023, 11 Pages.
Final Office Action mailed on Aug. 27, 2024, in U.S. Appl. No. 17/733,301, 15 pages.
Non-Final Office Action mailed on May 9, 2024, in U.S. Appl. No. 17/517,329, 17 pages.
Final Office Action mailed on Feb. 12, 2025, in U.S. Appl. No. 17/855,417, 18 pages.
Final Office Action mailed on Feb. 13, 2025, in U.S. Appl. No. 17/961,189, 60 Pages.
Final Office Action mailed on Oct. 24, 2024, in U.S. Appl. No. 17/517,329, 15 pages.
Non-Final Office Action mailed on Sep. 28, 2024, in U.S. Appl. No. 17/961,189, 56 pages.
International Search Report and Written Opinion received for PCT Application No. PCT/US2022/044776, mailed on Jan. 18, 2023, 10 Pages.
Non-Final Office Action mailed on Dec. 10, 2024, in U.S. Appl. No. 17/733,301, 14 Pages.

* cited by examiner

IMPORTING AGENT PERSONALIZATION INSTANTIATE A PERSONALIZED AGENT IN A USER GAME SESSION

CROSS-REFERENCE TO RELATED APPLICATIONS

This application claims priority to U.S. Provisional Application Ser. No. 63/345,216, filed May 24, 2022, entitled "Creation and Personalization of Virtual Gamers," the entire disclosure of which is hereby incorporated herein by reference.

BACKGROUND

The gaming industry makes up a large portion of the technology sector. As the technology looks towards a future that is more and more connected, gaming will be a central component of the connected future. Artificial intelligence has always been a major component of the gaming industry in general, however, as AI developments continue to advance, it becomes more difficult for the gaming industries to incorporate the advances into games. For example, it is difficult for game development studios to incubate AI as the majority of advanced AI systems require a lot of custom domain expertise.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to a personalized agent service that generates and evolves customized agents that can be instantiated in-game to play with users. Machine learning models are trained to control the agent's interactions with the game environment and the user during gameplay. As the user continues to play with the agent, the one or more machine learning models develop gameplay styles for the agent that complement the user's preferred playstyle, incorporate the user's preferred strategies, and is generally customized for interaction with the user. The agent personalization data generated during gameplay is stored by the service, thereby allowing the user to import the agent in different games, thereby creating a constant gameplay companion that the user can play with across a variety of different games without requiring the different games to include technology capable of developing AI controlled agents.

In further aspects, a user device is disclosed which allows a user to request that a personalized agent join the user's gameplay session. The user device sends a request for the personalized agent to a game platform. The game platform determines whether the user has a license to execute a second instance of the game. When the user has a license to execute a second instance of the game, the second instance of the game may be executed on the user device. Information received from a personalized agent service is used to instantiate a personalized agent in the second instance of the game. A communication session is established between the device executing the second instance of the game and the personalized agent service. The personalized agent service analyzes the game data using one or more machine learning models to determine a current game state. Based upon the current game state, one or more actions are determined to control the personalized agent's gameplay.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1A:
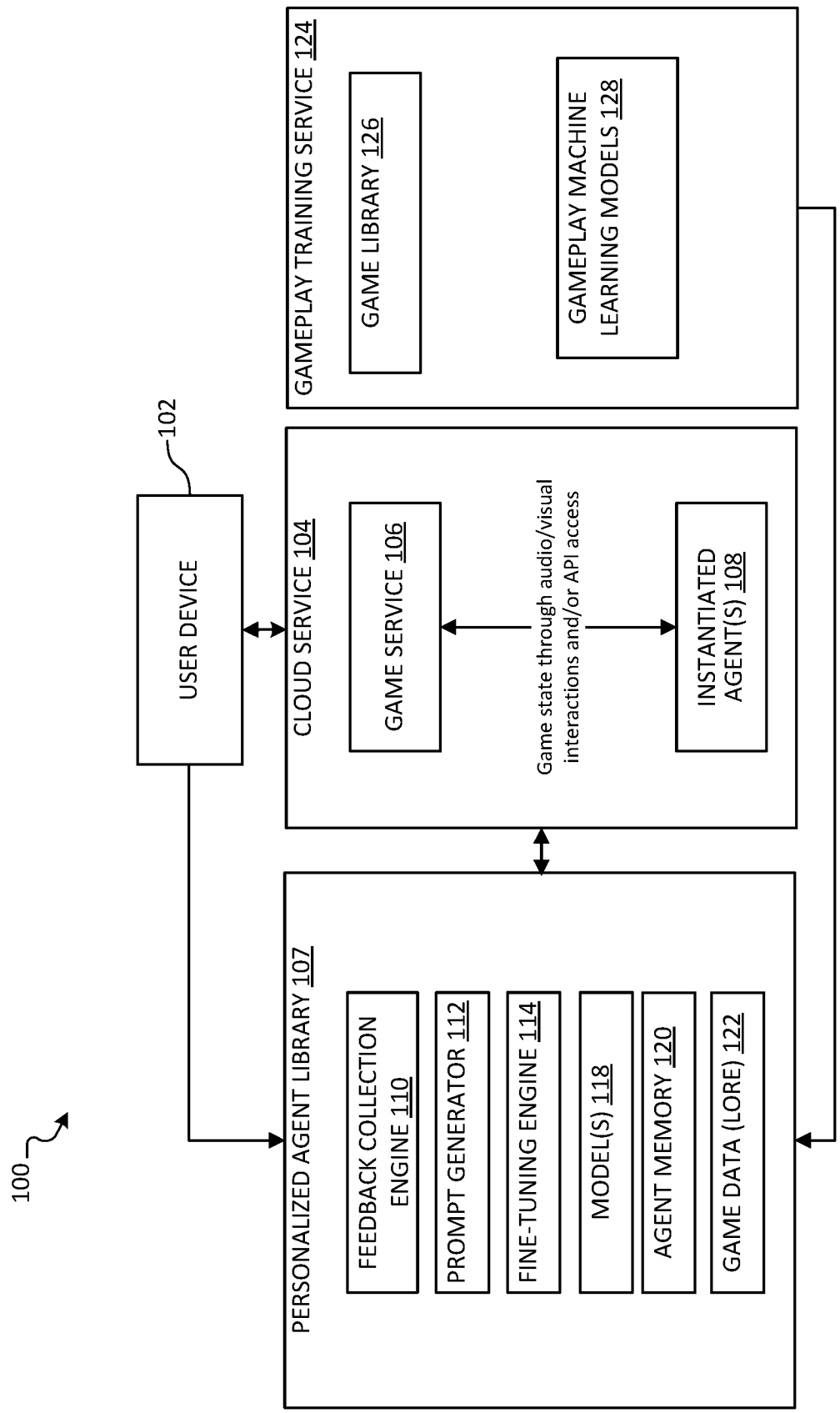
FIG. 1A illustrates an overview of an example system for generating and using user personalized agents in a gaming system.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Aspects of the present disclosure provide systems and methods which utilizes machine learning techniques to provide a personalized agent or bot that can be used in gaming or other types of environments. Among other examples, aspects disclosed herein relate to: using reinforcement learning agents that can be trained via computer vision without relying upon deep game hooks; training agents using models (e.g., foundation models, language models, computer vision models, speech models, video models, audio models, multimodal machine learning models, etc.) such that the agents are operable to understand written and spoken text, have a defined body of knowledge, and may write its own code; providing agents that interpret state information using computer vision and audio cues, providing agents that receive user instructions based upon computer vision and audio cues, and provide a system in which user feedback is used to improve the future interactions with agents across different games and applications.

In examples, a generative multimodal machine learning model processes user input and generates multimodal output. For example, a conversational agent according to aspects described herein may receive user input, such that the user input may be processed using the generative multimodal machine learning model to generate multimodal output. The multimodal output may comprise natural language output and/or programmatic output, among other examples. The multimodal output may be processed and used to affect the state of an associated application. For example, at least a part of the multimodal output may be executed or may be used to call an application programming interface (API) of the application. A generative multimodal machine learning model (also generally referred to herein as a multimodal machine learning model) used according to aspects described herein may be a generative transformer model, in some examples. In some instances, explicit and/or implicit feedback may be processed to improve the performance of multimodal machine learning model.

In examples, user input and/or model output is multimodal, which, as used herein, may comprise one or more types of content. Example content includes, but is not limited to, spoken or written language (which may also be referred to herein as "natural language output"), code (which may also be referred to herein as "programmatic output"), images, video, audio, gestures, visual features, intonation, contour features, poses, styles, fonts, and/or transitions, among other examples. Thus, as compared to a machine learning model that processes natural language input and generates natural language output, aspects of the present disclosure may process input and generate output having any of a variety of content types.

In doing so, the systems and methods disclosed herein support personalized agents that learn who the user (also referred to herein interchangeably as the "player") is, how the user speaks, what the user strategies are, and how the user plays. It retains a "memory" of past interactions with the user and can act as a constant companion to the user as the user engages in different experiences, such as playing different games, playing different game modes, etc. In order to do so, aspects disclosed herein are operable to store meta classifications (e.g., sentiment analysis, intent analysis, etc.) associated with the personal data about the user, provided the user has given permission to do so.

FIG. 1 illustrates an overview of an example system 100 for generating and using user personalized agents in a gaming system. As depicted in FIG. 1, a user device 102 interacts with a cloud service 104 which hosts game service 106 (or other type of application) and an instantiation of an agent 108 that is capable of interacting with the game. A gaming device may be a console gaming system, a mobile device, a smartphone, a personal computer, or any other type of device capable of executing a game locally or accessing a hosted game on a server. In one example, a game associated with the game service 106 may be hosted directly by the cloud service 104. In an alternate example, the user device may host and execute a game locally, in which case the game service 106 may serve as an interface facilitating communications between one or more instantiated agents 108 and the game. The personalized agent library 107 may store and execute components for one or more agents associated with a user of user device 102. The components of the personalized agent library 107 may be used to control the instantiated agent(s) 108.

In example, one or more agents from the personalized agent library 107 interact with the game via an instantiated agent(s) 108 based upon text communications, voice commands, and/or player actions received from the user device 102. That is, system 100 supports interactions with agents as if they were other human players or alternatively, as a player would normally interact with a conventional in-game NPC. In doing so, one or more agents hosted by the agent library 108 are operable to interact with different games that the user plays without requiring changes to the game. That is, system 100 is operable to work with games without requiring the games to be specifically developed to support the agents (e.g., the agents do not require API access, games do not have to be developed with specific code to interact with the agents, etc.). In doing so, system 100 provides a scalable solution which allows users to play with customized agents across a variety of different games. That is, game state is communicated between one or more instantiated agents 108 a game via game service 106 using audio and visual interactions and/or an exposed API. In doing so, the instantiated agent(s) 108 are able to interact with the game in the same manner as a user (e.g., by interpreting video, audio, and/or haptic feedback from the game) and/or in the same manner as an in-game NPC (e.g., via the exposed API). Similarly, the one or more agents are capable of interacting with the user playing the game using gaming device 102 as another player would or in a manner similar to an NPC interacting with the user. That is, the one or more agents are capable of receiving visual, textual, or voice input from the user playing the game via game service 106 and/or game information (e.g., current game state, NPC inventory, NPC abilities, etc.) via an exposed API. As such, the system 100 allows the user playing the game via the user device 102 to interact with the one or more agents as they would interact with any other player on NPC, however, the instantiated agent(s) 108 may be personalized to the user based upon past interactions with the user that occurred both in the current game and in other games. In order to facilitate this type of user interaction, the one or more instantiated agents 108 may employ computer vision, speech recognition, or other known techniques when processing interactions with the user in order to interpret commands received from the user and/or generate a response action based upon the user's actions.

For example, consider a user playing a first-person shooter with a personalized agent. The user may say "cover the right side." A speech recognition model that may be one of the models 118 may be utilized to interpret the audio received from the user to a modality understood by the agent. In response, the agent 108 may take a position on the right side of the user or otherwise perform an action to cover the right side of the user in response to the user's audio instruction. As yet another example, consider an action role playing game in which two objectives must simultaneously be defended. An agent playing in conjunction with the user may employ computer vision to analyze a view current view of the game to determine that two objectives exist (e.g., identifying two objectives on a map, interpreting a displayed quest log indicating that two objectives must be defended, etc.). Similarly, computer vision may be used to identify the user's player character and determine the player character is heading to the first objective. Based upon the feedback from the computer vision model, the agent can instruct its representative character to move towards and defend the second objective.

From these examples, one of skill in the art will appreciate that, by employing speech recognition, computer vision techniques, and the like, the one or more agents from the agent library will be able to interact with the user in a manner similar to how other users would interact during cooperative gameplay. In doing so, one or more agents from the agent library can be generated separate from a specific game as the instantiated agent(s) 108 may not have to have API or programmatic access to the game in order to interact with the user. Alternatively, the instantiated agent(s) 108 may have API access or programmatic access to the game, such as, when the instantiated agent is "possessing" and in-game NPC. In said circumstances, the agent may interact with the game state and user based via the API access. Because system 100 provides a solution in which agents can be implemented separate from the individual games, the one or more agents in the agent library can be personalized to interact with a specific user. This personalization can be carried across different games. That is, over time, the agent learns details about the user, such as the user's likes and dislikes, the user's playstyles, the user's communication patterns, user's preferred strategies, etc., and be able to accommodate the user accordingly across different games.

The agent personalization may be generated, and updated over time, via the feedback collection engine 110. Feedback collection engine 110 receives feedback from the user and/or from the instantiated agent(s) 108 that are performed in-game. The feedback collected can include information related to the user's playstyle, user communication, user interaction with the game, user interaction with other players, user interaction with other agents, outcomes of the instantiated agent(s) 108 actions performed in game, interactions between the player and the instantiated agent(s) 108 actions in game or any type of information generated by user device 102 as a user plays a game. In order to comply with user privacy considerations, information may only be collected by the feedback collection engine 110 upon receiving permission from the user to do so. The user may opt in or out of said collection at any time. The data collected may be implicit data, e.g., data based upon the user's normal interactions with the game, or explicit data, such as specific commands provided by the user to the system. An example of a specific command may be the user instructing an agent to address the user by a specific character name. Data collected by the feedback collection engine 110 may be provided to a prompt generator 112.

The prompt generator 112 may use data collected by the feedback collection engine 110 to generate prompts used to personalize the one or more agents of the agent library 108. That is, the prompt generator 112 interprets the collected feedback data to generate instructions that can be executed by the one or more agents to perform actions by the agent. The prompt generator is operable to generate new prompts or instructions based upon the collected feedback or alter existing prompts based upon newly collected feedback. For example, if a user initially plays a game as a front-line attacker, prompt generator 112 may generate instructions that cause the instantiated agent(s) 108 to implement a supporting playstyle, such as being a ranged attacker or a support character. If the user transitions playstyle to one of a ranged damage dealer, the prompt generator 112 can identify this change via the feedback data and adjust the instantiated agent(s) to adjust to the player's new style (e.g., switch to a front-line attacker to pull aggro or enmity from the player character). Instructions generated by the prompt generator are provided to the cloud service 104 to be stored by the cloud service 104 as part of the agent library 108, thereby storing meta classifications (e.g., sentiment analysis, intent analysis, etc.) associated with a specific user. In doing so, the instructions generated based upon user playstyle or preference in a first game can be incorporated by the agent in not only the first game, but other games that the user plays. That is, using instructions generated by the prompt generator 112, the cloud service 104 can instantiate agents that across a variety of different games that are already personalized for a specific user based upon the user's prior interactions with an instantiated agent(s) 108, regardless of whether the user is playing the same game or a different game. While aspects described herein describe a separate prompt generator 112 as generating commands to control the instantiated agent(s) 108, in alternate aspects, the commands may be generated directly by the one or more machine learning models employed by the agent library 107, or via a combination of various different components disclosed herein.

In some scenarios, however, there may be issues encountered during the training process for the various machine learning models that may be leveraged to generate a personalized agent. For example, there could be a failed training session due to data or processing errors. In yet another example, the training process may fail due to user error. For example, a user picking up a new game may play the game incorrectly at first. The user's incorrect actions or experiences might train the personalized agent to play in a manner that negatively affects gameplay. As such, system 100 may include processes to rollback or reset the one or more machine learning models (or any of the other components disclosed herein) in order to correct errors that may occur while training the one or more machine learning models or any other errors that may occur in general as the personalized agent is developed. For example, the system 100 may periodically maintain a snapshot of the different machine learning models (or other components) that save the state of the component at the time of the snapshot. This allows the system 100 to rollback all the components, a subset of components, or specific components in response to detecting training errors in the future. A plurality of different snapshots can be store representing states of the personalized agent as it develops overtime, thereby providing the system 100 (or the user) options to determine an appropriate state for rollback upon encountering an error.

The personalized agent library 107 may also include a fine-tuning engine 114 and one or more models 116. The fine-tuning engine 114 and models 116 are operable to interact with the user actions via the user device 102, the instantiated agent(s) 108, and game training model(s) 124 in order to process the feedback data received form the various sources. Any number of different models may be employed individually or in combination for use with the examples disclosed herein. For example, foundation models, language models, computer vision models, speech models, video models, and/or audio models may be employed by the system 100. As used herein, a foundation model is a model trained on broad data that can be adapted to a wide range of tasks (e.g., models capable of processing various different tasks or modalities).

The one or more models 116 may process video, audio, and/or textual data received from the user or generated by the game during gameplay in order to interpret user commands and/or derive user intent based upon the user communications or in-game actions. The output from the one or more models 116 is provided to the fine-tuning model 114 which can use the output to modify the prompts generated by prompt generator 112 in order to further personalize the instructions generated for the user based upon the agent's past interactions with the user. The Personalized agent library 107 may also include a game data (lore) 122 component which is operable to store information about various different games. The game data (lore) 122 component stores information about a game, the game's lore, story elements, available abilities and/or items, etc. that the agent can be utilized by the other components (e.g., models 118, fine-tuning engine 114, prompt generator 112, etc.) to generate instructions to control the instantiated agent(s) 108 in accordance with the game's themes, story, requirements, etc.

The various components described herein may be leveraged to interpret current game states based upon data received from the game (e.g., visual data, audio data, haptic feedback data, data exposed by the game through APIs, etc.). Further, the components disclosed herein are operable to generate instructions to control the personalized agent's actions in game based upon the current game state. For example, the components disclosed herein may be operable to generate instructions to control the personalized agent's interaction with the game in a similar manner as a human would interact with the game (e.g., by providing specific controller instructions, keyboard instructions, or any other type of interfaces with supported gameplay controls). Alternatively, or additionally, the various components may generate code which controls how the personalized agent interacts in the game. For example, the code may be executed by the personalized agent which causes the personalized agent to perform specific actions within the game.

Personalized agent library 107 may also include an agent memory component 120. The agent memory component can be used to store personalized data generated by the various other components described herein as well as playstyles, techniques, and interactions learned by the agent via past interactions with the user. The agent memory 120 may provide additional inputs to the prompt generator 112 that can be used to determine the instantiated agent(s) actions during gameplay.

To this point, the described components of system 100 have focused on the creation of personalized agents, the continued evolution of personalized agents via continued interaction with a user, and the instantiation of personalized agents in a user's gaming session. While personalization of the agents for specific user provides many gameplay benefits, the instantiated agents also require and understanding of how to interact with and play the game. In one aspect, the components of the personalized agent library 107 are operable to learn and refine the agent's gameplay based upon sessions with the user. However, when the user plays a new game, the time required for the agent to learn gameplay mechanics in order to be a useful companion may not be feasible through gameplay with the user alone. In order to address this issue, system 100 also includes a gameplay training service 124 which includes a game library 126 and gameplay machine learning models 128. In aspects, the game library includes any number of games that are supported by the cloud service 104 and/or the user device 102. The gameplay training service 124 is operable to execute sessions for the various games stored in game library 126 and instantiate agents within the executed game. The gameplay machine learning models 128 are operable to receive data from the executed game and the agent's actions performed in the game as input and, in response, and generate control signals to direct the gameplay of the agent within the game. Through use of reinforcement learning, the gameplay machine learning models are operable to develop an understanding of gameplay mechanics for both specific games and genres of games. In doing so, the gameplay training service 124 provides a mechanism in which agents can be trained to play specific games, or specific types of games, without requiring user interaction. The personalized agent library 107 is operable to receive trained models (or interact with the trained models) from the gameplay training service 124, which may be stored as part of the agent memory, and employ those models with the other personalization components to control the instantiated agent(s) 108. In doing so, the user experience interacting with the agent in-game is greatly enhanced, as the user would not be required to invest the time to train the agent in the game's specific mechanics. Additionally, by importing or interacting with the trained gameplay machine learning models 128 provided by the gameplay training service 124, personalized agent library 107 is able to employ trained instantiated agent(s) 108 to play with the user the first time a user boots up a new game.

One of skill in the art will appreciate that the system 100 provides a personalized agent, or artificial intelligence, that is operable to learn a player's identity, learn a player communication style or tendencies, learn the strategies that are employed and used by a player in various different games and scenarios, learn gameplay mechanics for specific games and game genre's etc. Further, the one or more agents generated by system 100 can be stored as part of a cloud service which allows the system to retain a "memory" of a user's past interactions, thereby allowing the system to generate agents that act as a consistent user companion across different games without requiring games to be designed specifically to support such agents.

Figure 1B:
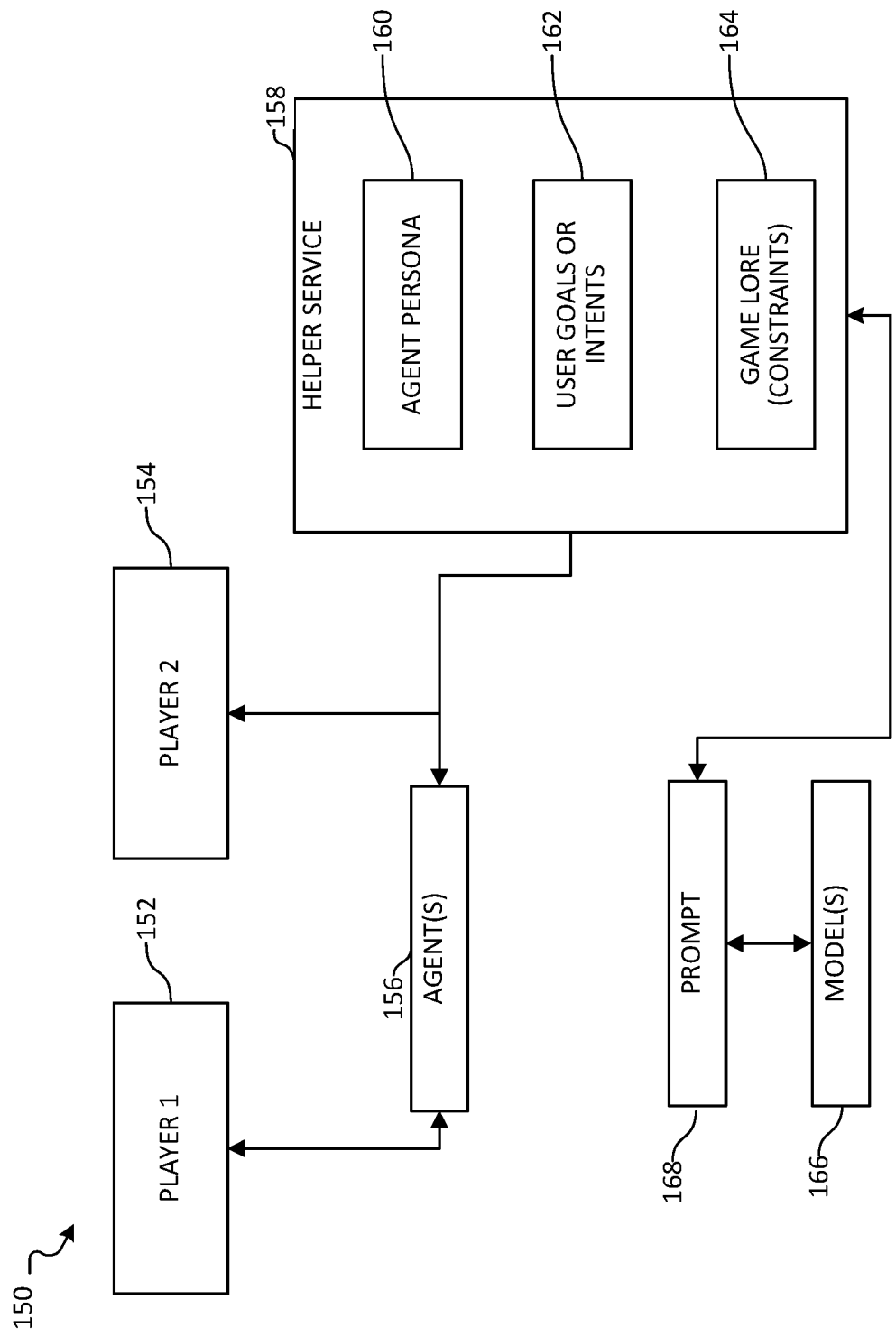
FIG. 1B illustrates on overview of an example system for generating and utilizing personalized agent responses in a gaming system.

FIG. 1B illustrates on overview of an example system 150 for generating and utilizing personalized agent responses in a gaming system. As depicted in system 150, two players, player 1 152 and player 2 154 are interacting with one or more agents 156. Although two players are shown, one of skill in the art will appreciate that the any number of players can participate in a gaming session using system 150. A helper service 158 is provided which helps personalize the one or more agents 158 interactions with the individual players, or with multiple players simultaneously. As discussed in FIG. 1A, one or more models 166 may be used to generate or modify prompts 168. The prompts 168 are provided to the helper service 158, which applies a number of engines (e.g., agent persona engine 160, user goals or intents engine 162, and game lore or constraints engine 164) to modify the prompt to provide a more personalized interaction with the individual or group of players.

For example, agent persona engine 160 may modify or adjust a prompt (or action determined by a prompt) in accordance with the personalization information associated with the agent. For example, the user may employ an agent with a preferred personality. Agent persona engine 160 may modify the prompt or response to generated by the prompt in accordance with the agent's personality. User intent or goals engine may modify the prompt (or action determined by the prompt) based upon the user's current goal or an intent behind the user's action or request. The user's goals or intent may change over time, may be based upon a specified user goal, or may be determined based upon the user's actions. Game lore or constraints engine 164 may modify or adjust a prompt (or action determined by a prompt) in accordance with characteristics of the game. For example, the agent may be "possessing" an in-game non-player character (as discussed in further detail below). The game lore or constraints engine 164 may modify the prompt based upon the NPCs personality or limitations. The various engines of the helper service may be employed individually or in combination when modifying or adjusting the prompts. The adjusted prompt is then provided to the one or more associated agents 156 for execution.

Figure 2:
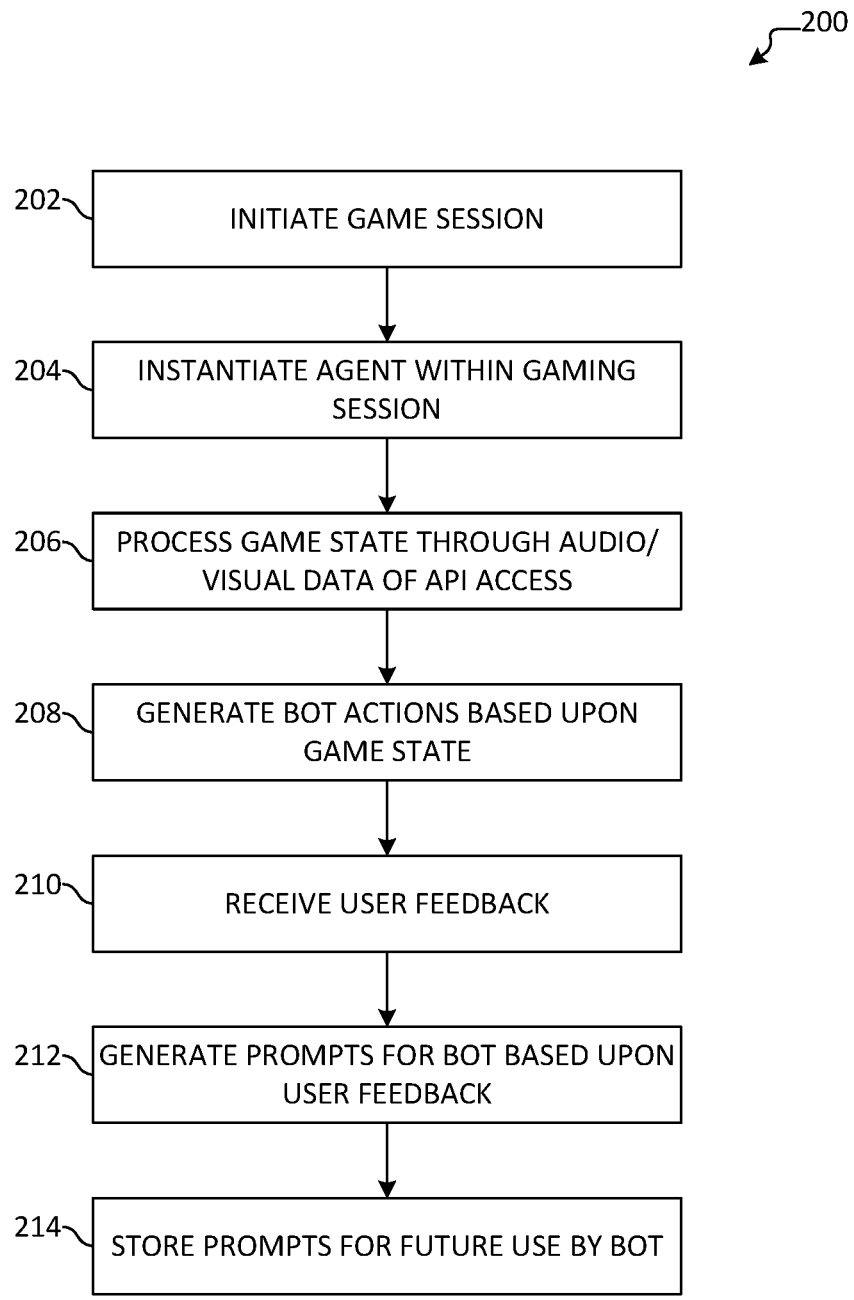
FIG. 2 illustrates an example of a method for generating personalized agents.

FIG. 2 illustrates an example of a method 200 for generating personalized agents. For example, the method 200 may be employed by the system 100. Flow begins at operation 202 where a game session is instantiated, or an indication of a game session being instantiated is received. As noted above, the game session may be hosted by the system performing the method 200 or may be hosted by a user device, such as on a gaming console. Upon instantiating the game or receiving an indication that a game session is established, flow continues to operation 204 where an agent is instantiated as part of a game session. In one example, the agent may be instantiated in response to receiving a request to add the agent to the game session. For example, a request may be received to instantiate an agent in a multiplayer game or an agent to control an NPC or AI companion in a single player game. Instantiating the agent may comprise identifying an agent from an agent library associated with the user playing the game. As noted above, aspects of the present disclosure provide for generating agents that can be played across different games. As such, the agent instantiated at operation 204 may be instantiated using various components that are stored as part of a personalized agent library. For example, the agent may be instantiated using personalization characteristics learned overtime through interactions with the play, game data or lore saved regarding a specific game or genre, machine learning models trained to perform mechanics and actions specific to the game in which the agent is to be instantiated or trained based upon a similar genre of game as the game in which the agent is to be instantiated, etc. As discussed previously, the selected agent may be personalized to the user playing the game based upon past interactions with the user in the same game as the one initiated at operation 202 or a different game. Alternatively, rather than instantiating an agent dynamically using different component stored in the agent library, a specific agent may be selected at operation 204. That is, the agent library may contain specific "builds" for different types of agents that were designed by the user or derived though specific gameplay with the user. These agents may be saved and instantiated by the user in future gaming sessions for the same game as they were initially created or in different games. Upon instantiating the agent at operation 204, the agent joins the gaming session with the user.

At operation 206, the current game state is interpreted through audio and visual data and/or through API access granted to the agent by the game. As previously noted, certain aspects of the disclosure provide for the generation of agents that can interact with a game without requiring API or programmatic access to the game. As such, the instantiated agent interacts with the game in the same way a user would, that is, through audio and visual data associated with the game. Alternatively, the agent may be granted API access to the game, for example, when the agent is possessing an NPC, in order to interact with the game. At operation 206, various speech recognition, computer vision, object detection, OCR processes, or the like, may be employed to process communications received from the player (e.g., spoken commands, text-based commands) and game state through the current displayed view (e.g., using computer vision) or via an API to interpret game state. The current game state is then used to generate agent actions at operation 208. For example, an agent action may be performed based upon a spoken command received from the user. Alternatively, an agent command may be generated based upon the current view. For example, if an enemy appears on screen, computer vision and/or object detection may be used to identify the enemy, and a command for the agent to attack the enemy may be generated at operation 208. Although not shown, operations 206 and 208 may be continually performed while the gaming session is active.

Flow continues to operation 210 where user feedback is received. The user feedback received may be explicit. For example, the user may issue a specific command to an agent to perform an action or to change the action they are currently performing. Alternatively, or additionally, user feedback may be implicit. Implicit user feedback may be feedback data that is generated based upon user interactions with the game. For example, the user may not explicitly provide a command to an agent, rather, the user may adjust their actions or playstyle based upon the current game state and/or in response to an action performed by the agent. In examples, user feedback may be collected continually during the gaming session. The collected feedback may be associated with concurrent game states or agent actions.

Upon collecting the user feedback, flow continues to operation 212 where prompts are generated for the one or more agents based upon the user feedback. In examples, the generated prompts are instructions to perform agent actions in response to the state of the game or specific user interactions. The prompts may be generated using one or more machine learning models which receives the user feedback, and/or actions performed by the one or more agents, and/or existing prompts, and/or state data. The output of the machine learning model may be used to generate one or more prompts. In examples, the machine learning model may be trained using information related to the user such that the output from the machine learning model is personalized for the user. Alternatively, or additionally, the machine learning model may be trained for a specific game or application, for a specific group of users (e.g., an e-sports team), or the like. Multiple machine learning models may be employed at operation 212 to generate the prompts. In still other examples, other processes, such as a rule-based process, may be employed in addition to or instead of the use of machine learning models at operation 212. Further, new prompts may be generated at operation 212 or existing prompts may be modified.

Once the one or more prompts are generated at operation 212, flow continues to operation 214 where the one or more prompts are stored for future use by the one or more agents. For example, the one or more prompts may be stored in an agent library. By storing the prompts generated at 212 with the agent library, the agent will be able to utilize the prompts to interact with the user across different games, thereby providing a personalized agent that a user can play with across different games.

Figure 3:
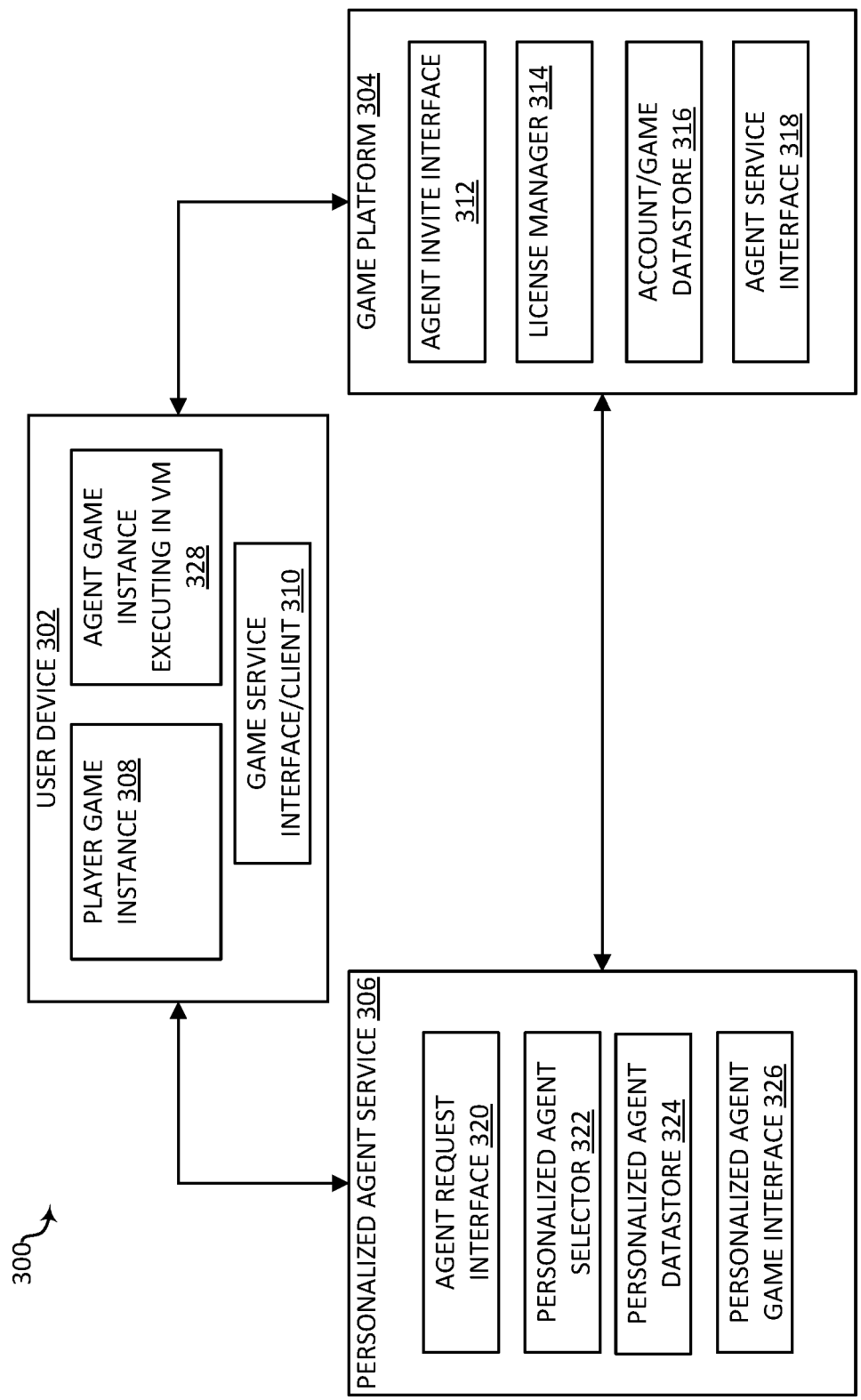
FIG. 3 depicts an exemplary system for instantiating a personalized agent to participate in gameplay with a user.

FIG. 3 depicts an exemplary system 300 for instantiating a personalized agent to participate in gameplay with a user. For clarity of description, system 300 is described as including specific devices performing described actions in a specific order. One of skill in the art, however, will appreciate that other devices may be included as part of system 300, or the described actions may be performed in different order and/or the described request may originate from or be sent to different devices without departing from the scope of the disclosure. As depicted in FIG. 3, the system 300 may include a user device 302, a game platform 304, and a personalized agent service 306. Although not shown, in one aspect user device 302, game platform 304, and personalized agent service 306 may be separate devices that communicate over a network. Alternatively, the components of the user device 302, game platform 304, and personalized agent service 306 may be resident on the same device or network of devices. For example, game platform 304 and personalized agent service 306 may be part of the same cloud network.

User device 302 may be a gaming console, a personal computer, a smartphone, a tablet, or any other type of device capable of executing a gaming application. Game platform 304 may be one or more server, or a cloud network, that support gaming services. Exemplary services supported by game platform 304 may be, for example, hosting online multiplayer gaming, delivering digital media, manage licenses and entitlements, manage friends lists, allow communications between players, etc. Examples of game platforms include, but are not limited to, XBOX LIVE, STEAM, PLAYSTATION NETWORK, BATTLE.NET, and the like. Personalized agents service 306 may be a server, or cloud network, capable of training and maintaining a library of personalized agents for a user that can be employed across a variety of different games. Although shown as a separate entity or network, in some aspects the personalized agent service 306 may be part of or share the same network as the gaming platform 304.

User device 302 may execute a player game instance 308 for a user. The player game instance may be any multiplayer (or in some instance, single player) game. A user that is participating in the player game instance 308 may access a contact or friends list via the game instance, or that is hosted by the game platform 304. For example, user device 302 may include a game service interface/client 310 which allows the user to access their contact or friends list hosted by the game platform 304. In one example, the game service/client interface 308 may be a component of the user device 302 operating system, for example, the operating system of a gaming console. Alternatively, or additionally, the game service/client interface 308 may be part of an application residing on the user device 308, such as a client-side application for game platform 304. As an example, a user may desire to invite friend to join a game session associated with the player game instance 308. As such, the user may access their contact or friends list through the player game instance 308 or via the game service interface/client 310 to see if any of their friends are online. In some instance, the user may be playing at a time when none of their friends are available, none have the desire to play the same game as the user, or none of the user's friends have a character or class specification needed to play with the user. Via integration with the personalized agent service 306, aspects of the present disclosure may also display one or more personalized bots associated with the user as part of the user's contact or friends list. As such, if the user is not able to find a friend that is available or willing to play, the user can invite one or more of their personalized agents to play with the user. In one example, the user may one or more personalized agents as the user would invite other human players to join the game session, e.g., by selecting a specific agent from the user's friends list. For example, the user may have one or more predefined agents that can be selected directly from the friends list. Alternatively, or additionally, in another example, as part of inviting the personalized agent, the user may select or provide additional parameters with the agent related to characteristics for the agent, such as specific character traits or abilities, specific strategies, specific playstyles, specific roles, etc. These parameters may be associated with the invite to have the personalized agent join the user's gaming session. The invite to the agent may be provided to the game platform 304 via the game service interface/client 310.

As discussed herein, aspects of the present disclosure relate to allowing a user to invite personalized agents to join the user in a gameplay session without requiring the individual games to explicitly support agent creation or agent gameplay. As such, from the perspective of the game being played by the user, addition of a personalized agent would be indistinguishable from adding a new human player to the game. Due to this, in order for the personalized agent to join the game, a new instance of the game would be required for the personalized agent to join, just as a joining human player would have to have access to play the game (e.g., by owning a copy of the game, having a license to the game, owning a subscription to the game, etc.). Game platform 304 may include ana agent invite interface 312 operable to receive the request to invite the agent from the user device 302. In response to receiving the request to add the personalized agent from the user device 302, the game platform 304 may determine that the invite is for a personalized agent (as opposed to another human player) via the agent invite interface 312, for example, via the identification of the agent in the invite, via the additional parameters associated with the invite, etc. Upon determining the invite is for a personalized agent, the game platform 304 may determine whether the user of the personalized agent has a license to play the game. For example, licensing manager 314 may perform a lookup to determine whether the user has multiple licenses for the game associated with the request to invite the personalized agent. If the user has multiple licenses to the game, or has additional licensed accounts for the game, the personalized agent may use one of the additional licenses to join the game. Alternatively, either the game platform 304, or the game itself, may provide or allow the user to purchase agent licenses. The agent licenses may be limited to allow agents (rather than other human players) to execute an instance of the game in order to play with the user. As the licenses are limited to the agents, agent licenses may be offered to the user for a fee that differs from standard game licenses (e.g., may be less than a standard game license, may be more than a standard game license, may be a certain fee an initial game license which will increase or decrease as the user purchases additional agent licenses, etc.). If license manager 314 is not able to find additional user or agent licenses, the game platform 304 may transmit a request to the user device 302, for example, via the agent invite interface 312, causing user device 302 to prompt the user to purchase an additional game license or agent license. Upon successful purchase of the additional game or user license, the additional game or user license may be added to the user's account, for example, via the license manager 304. When the user has the additional game license or agent license, the license manager 314 may acquire any entitlement and/or license information required to instantiate the additional game session for the agent and the game platform 304 may send the entitlement and/or license information to user device 302, thereby allowing user device 302 to instantiate a new instance of the game for the agent.

Once the proper licenses have been confirmed by the game platform or, alternatively, the game itself, the game platform may generate a request to the personalized agent. For example, the game platform 304 may aggregate personalized agent information from the agent invite request (e.g., a personalized agent identifier identifying a specific personalized agent, specific character traits or abilities, specific strategies, specific playstyles, specific roles, etc.) from the request. This information may be included as part of a request to create and/or instantiate a personalized agent in a newly created game session. Game platform 304 may also access additional information about the user or game that the agent is to join from the account/game data store 316. The account/game datastore 316 may store information about the user, such as the user's ID, gamertag, the user's player character info (e.g., class, role, stats, characteristics, etc.). This user information may also be included in the request to create and/or instantiate the personalized agent. In still further examples, the game platform may also access information about the game specifically, such as the game server or IP address that is to be associated with the gameplay session, account information associated with the personalized agent's character in the game (e.g., the personalized agent characters level, abilities, role, etc.). The information in the agent invite request from the user device 302, the user and/or game information from account/game datastore 316, and/or entitlement information for the personalized agent 318 may be aggregated by agent service interface 318 and packaged into a request to create and/or instantiate the personalized agent. The agent service interface 318 may then send the request to create and/or instantiate the personalized agent to the personalized agent interface 306.

The personalized agent interface 306 is operable to receive the request to create/and or instantiate the personalized agent from the game platform 304 via the agent request interface 320. The agent request interface 320 is operable to extract request parameters (e.g., information related to the personalized agent's requested characteristics, the user information, and/or the game information) and provide the request parameters to the personalized agent selector 322. The personalized agent selector 322 analyzes the request parameters and identifies requested agent characteristics based upon the request parameters. For example, the personalization selector may identify request for specific characteristics from the request parameters. Additionally, the personalization selector 306 may infer characteristics based upon request parameters. For example, information about the game, such as the game type or game genre, may be used to identify agent characteristics related to the game or NPC. For example, if the game is a roleplaying game, the personalization selector 306 may identify agent characteristics that are relevant or useful to roleplaying games. Similarly, if the game is a first-person shooter, the personalization selector 306 may identify agent characteristics related to first person shooter games. Similarly, characteristics of the personalized agent characters in-game character may be used to infer relevant agent characteristics. For example, if the personalized agent's in-game character is a healer, the personalization selector may identify agent characteristics that are relevant to a healer class. Upon identifying the relevant agent characteristics, agent data related to the relevant agent characteristics is retrieved from the personalized agent datastore 324. In examples, the personalized agent data store 3247 may store any type of personalization information (e.g., prompts, machine learning models, agent personality traits, etc.) that were previously generated for the agent. The retrieved personalization information may be aggregated from the personalized agent datastore 324 and exposed (e.g., sent to or provided access to) the user device 302, for example, via agent request interface 320.

Having received license and/or entitlement information from the game platform 304, user device 302 may execute a virtual machine on the client device. The virtual machine may be used to execute a second game instance for the agent character on the user device 302 while simultaneously executing the player game instance 308. Having established the virtual machine executing the personalized agent game instance 328, the user device may utilize the personalized agent information exposed by the personalized agent service 306 via agent request interface 320 to create an instance of the personalized agent based upon the received personalized agent data within the game session executed within the virtual machine 328. As such, client device 302 may not be executing two different instances of the game, one for the user's player character and one for the personalized agent's character. From the game's perspective, there are now two different instances of the game being operated by two different players. That is, the personalized agent may be able to interact with the game without requiring the game to provide support for the agent to interact (e.g., without creating specific APIs to allow the personalized agent to interact with the game). As such, the game's multiplayer functionality can be leveraged without modification to allow the user to invite their personalized agent to a game session when the user's friends are not online or otherwise not available to play the game with the user. However, since the game need not expose an API to allow agent interaction, the personalized agent is capable of engaging and interacting with the game as a normal human player. That is, the personalized agent is operable to receive visual, audio, and textual game data that is available to a human user, process the received data using one or more machine learning models to determine a current game state, and determine appropriate actions to perform based upon the current game state. In some instances, this process may be performed on the user device 302. However, in many instances, the user device 302 may not have the computation resources required to execute two different gaming sessions and one or more machine learning models to control the personalized agent gameplay simultaneously or, even if capable, without the introduction of lag that would negatively affect the user's gameplay experience. As such, the personalized agent service 306 may control the personalized agent's gameplay via the personalized agent game interfaced 326.

In certain aspects, the personalized agent service 306 may employ a personalized agent game interface 326 that is operable to receive current game data (e.g., video data, audio data, text data, communications between players, haptic information, etc.) generated by the agent game instance executed in the virtual machine 328. The current game data received by via the game interface 326 may be processed using the one or more machine learning models and/or the other components of the personalized agent library discussed in FIG. 1A in order to interpret current game state, determine the personalized agent's actions based upon the current game state, and transmit control instructions to control the gameplay of the personalized agent instantiated withing While certain functions are described as being performed by specific devices or components of system 300, one of skill in the art will appreciate that other devices or components that are part of system 300, or other devices not shown in FIG. 3, may perform the described actions and functionalities without departing from the scope of this disclosure. For example, while system 300 depicts both the player game instance 308 and the virtual machine game instance 328 as being executed on user device 302, in other aspects, the two game instances may be executed on other devices. For example, the game instances may be executed on the game platform 304, or a game server hosting a game session (not shown in FIG. 3).

Figure 4:
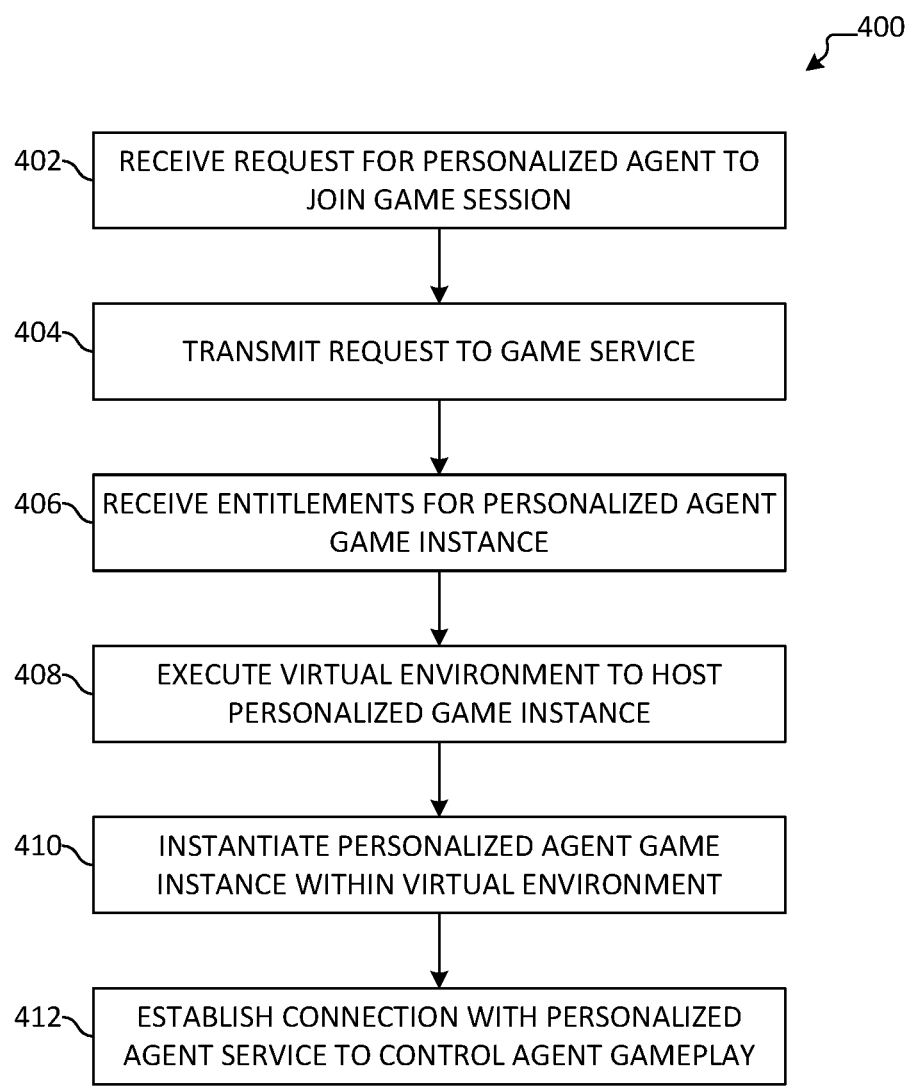
FIG. 4 depicts an exemplary method for creating a personalized agent game session and instantiating a personalized agent in agent game session.

FIG. 4 depicts an exemplary method 400 for creating a personalized agent game session and instantiating a personalized agent in agent game session. In one example, the method 400 may be performed by a user device executing a gaming session for the user's player character. In alternate examples, the method 400 may be performed using other devices, components, or cloud services described herein. Flow begins at operation 402 where a request to invite a personalized agent to join in gameplay with the user is received. The request may be received via a contact or friends invite interface. For example, the user may open their friends list and select one or more personalized agents to invite to the game. As discussed above, the request may be for a specific personalized agent and/or may include personalized agent characteristics. Upon receiving the request flow continues to operation 404 where a request to have the personalized agent join the gaming session is generated and transmitted to the gaming service. At operation 404, details about the personalized agent (e.g., an identifier for a specific personalized agent, personalized agent characteristics, etc.), information about the user (e.g., a user identifier which can be used to associate the user with their personalized agents or personalized agent data, user character information, etc.), and/or details about the game (e.g., a game identifier, a world or server identifier signifying the server the user is currently playing on, etc.) may be aggregated and transmitted to a game service which manages the user's contact or friends list, user entitlements, user multiplayer capabilities, etc. and/or a personalized agent game service.

In response to transmitting the request, flow continues to operation 406 where the device performing the method 406 receives entitlements for a personalized agent game session. Although not shown, as discussed above, prior to receiving the entitlement, a prompt may be generated that requires the user to obtain an additional game license or, alternatively, an additional agent license as discussed above, in order to execute an additional gaming session. Once the entitlements are received, the device performing the method 400 may have the data necessary to execute an additional instance of the game and connect the game to online game services. Flow then continues to operation 408 where the device performing the method 400 creates a virtual environment in which to execute an additional gaming session. The virtual environment (e.g., a virtual machine, a container, etc.) allows the device performing the method 400 to execute two different game sessions for the same game simultaneously (e.g., a gaming session for the user and a gaming session for the personalized agent).

Additionally, as discussed above, the device performing the method 400 may receive information about the personalized agent which allows the device to instantiate the personalized agent within the newly created gaming session in the virtual environment. The personalized agent information used to instantiate the personalized agent may be received from a personalized agent service, a game platform, or a combination of the two. In one example, the personalized agent information may identify the personalized agent's in-game character. As such, the personalized agent's in-game character may be selected at operation 410 to instantiate the personalized agent within the newly created gaming instance. Alternatively, or additionally, the personalized agent data may include information about the agent's characteristics, game data, components to control the personalized agent's gameplay (e.g., one or more machine learning models), etc. This information may also be used in addition to or in the alternative of the personalized agent's in-game character identifier to instantiate a personalized agent within the game.

As noted above, since API access may not be provided by the game to allow the personalized agent to directly interact with the game, the personalized agent may interact with the game as a human player would (e.g., by interpreting the current game state through visual and audio portions of the game and generate actions in response). However, the device performing the method 400 may not have the computational resources to support two different game sessions and execute the machine learning models required to control the personalized agent's gameplay. As such, at operation 412, a connection may be established with, for example, a personalized agent service. The connection may transmit current game state to the personalized agent service (e.g., visual, audio, haptic, player communications, etc.) and, in response, receive control signals to control the gameplay of the personalized agent within the game instance executed in the virtual environment. This connection is persistent during the personalized agent's gameplay, thereby allowing the personalized agent to continue playing with the user during the gaming session.

Figure 5:
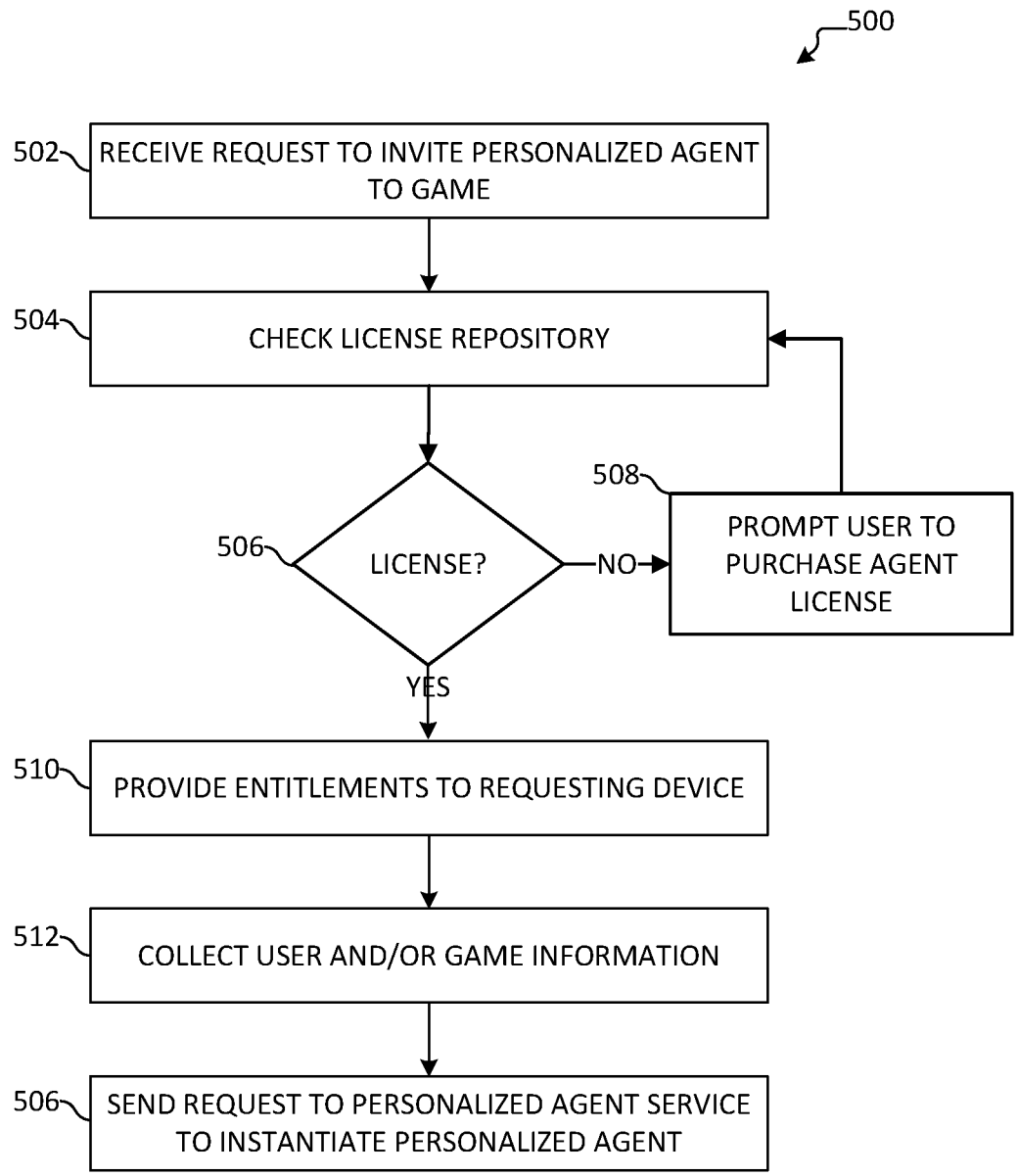
FIG. 5 depicts an exemplary method for determine whether a personalized agent game session can be established.

FIG. 5 depicts an exemplary method 500 for determine whether a personalized agent game session can be established. In one example, the method 500 may be performed by a gaming platform. In alternate examples, the method 500 may be performed using other devices, components, or cloud services, or a combination of such, as described herein. Flow begins at operation 502 where a request to invite a personalized agent to a game is received. For example, the request may be received from a user device executing a gaming session for a user. In aspects, details about the personalized agent (e.g., an identifier for a specific personalized agent, personalized agent characteristics, etc.), information about the user (e.g., a user identifier which can be used to associate the user with their personalized agents or personalized agent data, user character information, etc.), and/or details about the game (e.g., a game identifier, a world or server identifier signifying the server the user is currently playing on, etc.) may be included as parameters associated with the received request.

Flow continues to operation 504, where a license repository is checked to see if the user requesting the agent has the necessary licenses to establish a gaming session for the agent. In aspects, information about the user and game associated with the request may be used to query the license repository to determine if the user has additional licenses for the game or if the user has an unused agent license for the game or gaming platform. Based upon the results of a query, a determination of whether the user has the required licenses is made at operation 510. If the user does not have the correct license, flow branches NO to operation 508 where an instruction to prompt the user to obtain (e.g., purchase an additional game license or agent license) is transmitted to the requesting device. Flow then returns to operation 504 (or alternatively 502) where the process is continued until the required license is found in the repository.

If the user has the required game or agent license, flow branches YES from operation 506 to operation 510. At operation 510, entitlements required to establish an additional gaming session for a personalized agent is transmitted to the requesting device. As discussed above, said entitlements may be used by the requesting device to establish a new gaming instance and connect to the game's services. Flow continues to operation 512 where user and game information may be collected from one or more datastores managed by the gaming platform or the game itself. The information collected at operation 512 may relate to aspects of the game required to personalize the agent for the game being played by the user and/or to connect the personalized agent to the correct server or world in order to allow the agent to play with the user, etc. The collected information is aggregated and sent to a personalized agent service and/or the requesting user device at operation 506.

Figure 6A:
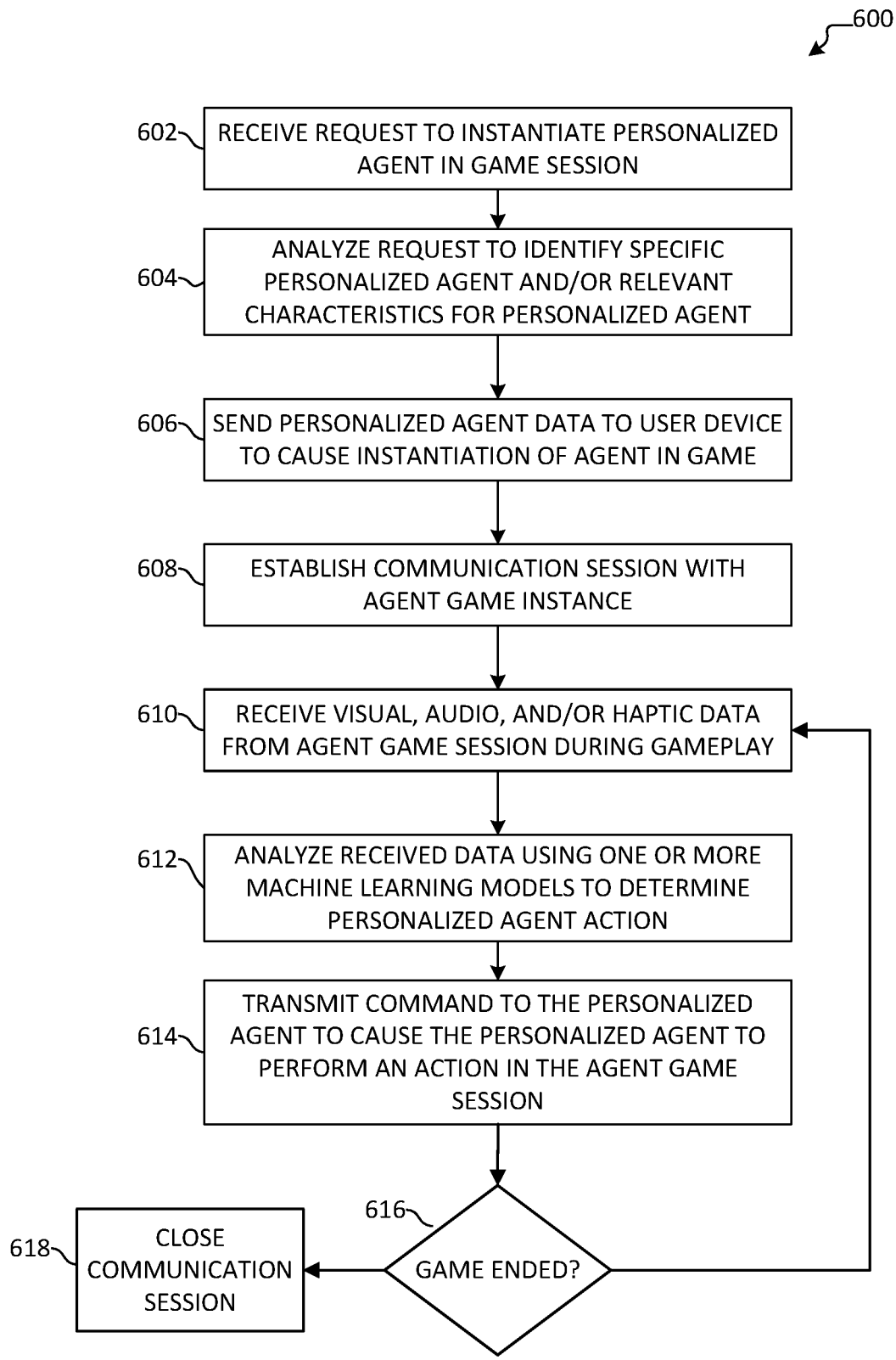
FIG. 6A depicts an exemplary method 600 for instantiating and controlling a personalized agent within a personalized agent game session.

FIG. 6A depicts an exemplary method 600 for instantiating and controlling a personalized agent within a personalized agent game session. In one example, the method 500 may be performed by a gaming platform. In alternate examples, the method 500 may be performed using other devices, components, or cloud services, or a combination of such, as described herein. Flow begins at operation 602 where a request to instantiate a personalized agent in a game session is received. The request may include information about a pre-existing personalized agent, such as an identifier identifying a specific agent. Alternatively, or additionally, the request may include information about requested characteristics of the agent, characteristics about the user and/or the user's player character in the game, and/or information about the game that the personalized agent is to be instantiated in. Flow continues to operation 604 where the request parameters are analyzed to identify a specific personalized agent and/or requested or relevant characteristics for a personalized agent. For example, the request parameters may be analyzed for specific characteristics to include in the personalized agent. Additionally, the method 600 may infer characteristics based upon request parameters. For example, information about the game, such as the game type or game genre, may be used to identify agent characteristics related to the game. For example, if the game is a roleplaying game, the personalization selector 306 may identify agent characteristics that are relevant or useful to roleplaying games. Similarly, if the game is a first-person shooter, the personalized agent selector 322 may identify agent characteristics related to first person shooter games. Based upon the analysis, a specific personalized agent and/or characteristics used to create the personalized agent for the requested gaming session may be gathered from a personalized agent data store associated with the user playing the game. At operation 606, the aggregated information about the personalized agent is sent to the device hosting the personalized agent's gaming session with instructions to instantiate the personalized agent within the gaming session. For example, the instructions may be used to instantiate a character within the game associated with the personalized agent character's past gaming sessions, instructions to create a new character to be controlled by the personalized agent, or the like. In one example, the personalized agent data and instructions to instantiate the personalized agent within a gaming session may be sent to the device executing the user's gaming session and/or a device executing the personalized agent's gaming session.

As discussed, from the game's perspective, there are now two different instances of the game being operated by two different players. That is, the personalized agent may be able to interact with the game without requiring the game to provide support for the agent to interact (e.g., without creating specific APIs to allow the personalized agent to interact with the game). As such, the game's multiplayer functionality can be leveraged without modification to allow the user to invite their personalized agent to a game session when the user's friends are not online or otherwise not available to play the game with the user. However, since the game need not expose and API to allow agent interaction, the personalized agent is capable of engaging and interacting with the game as a normal human player. That is, the personalized agent is operable to receive visual, audio, and textual game data that is available to a human user, process the received data using one or more machine learning models to determine a current game state, and determine appropriate actions to perform based upon the current game state. As such, at operation 608, a communication session is established with the device hosting the personalized agent's gaming session, e.g., the user device from FIG. 3 or another device. The communications session is used to receive game state information, in the form of audio data, visual data, haptic data, text data, etc. Further, the communication session established at operation 608 can be used by the device performing the method 600 to transmit control instructions to control the personalized agent's gameplay.

Upon establishing the communication session, flow continues to operation 610 where the device performing the method 600 received game data (e.g., visual, audio, haptic data) generated by the personalized agent's gaming session. The game data received at operation 610 may be the same game data that would be available to a human player. That is, the game data need not include API access to game data that would not be available to a human player. The received game data is analyzed using one or more machine learning models at operation 612. For example the received game data may be provided to one or more foundational machine learning models, object recognition models, speech recognition models, natural language understanding models, etc. in order to process the current game state. At operation 614, the output of the one or more machine learning models, either alone, or based upon further processing using the other components that are described as part of the personalized agent library 107 of FIG. 1, may be used to generate instructions to control the personalized agent's interactions during the game play in response to the current game state. Said actions, for example, include where to move the personalized agent's character, what ability or actions that the personalized agent character should perform, accessing the personalized agent character's inventory, etc. That is, any action that is available to be performed by a player in the game may be determined at operation 614 and transmitted to the device hosting the personalized agent's gaming session, thereby causing the instance of the personalized agent to perform the action in the game. In doing so, the personalized agent is able to interact and participate within the game without requiring the game to be developed specifically to support personalized agents. As such, the personalized agents that are developed over time through the user's continued gameplay can be employed by the user in the future to play with one or more personalized agents in the same or different games.

Flow continues to operation 616, where a determination is made as to whether the game is still ins session. If so, flow branches NO to operation 610, where the game data is continued to be received and processed by the device performing the method 600 to allow continuous gameplay between the personalized agent and the user. However, if the game has ended, flow branches YES to operation 618, where the communication session is ended and control of the personalized agent ceases.

Figure 6B:
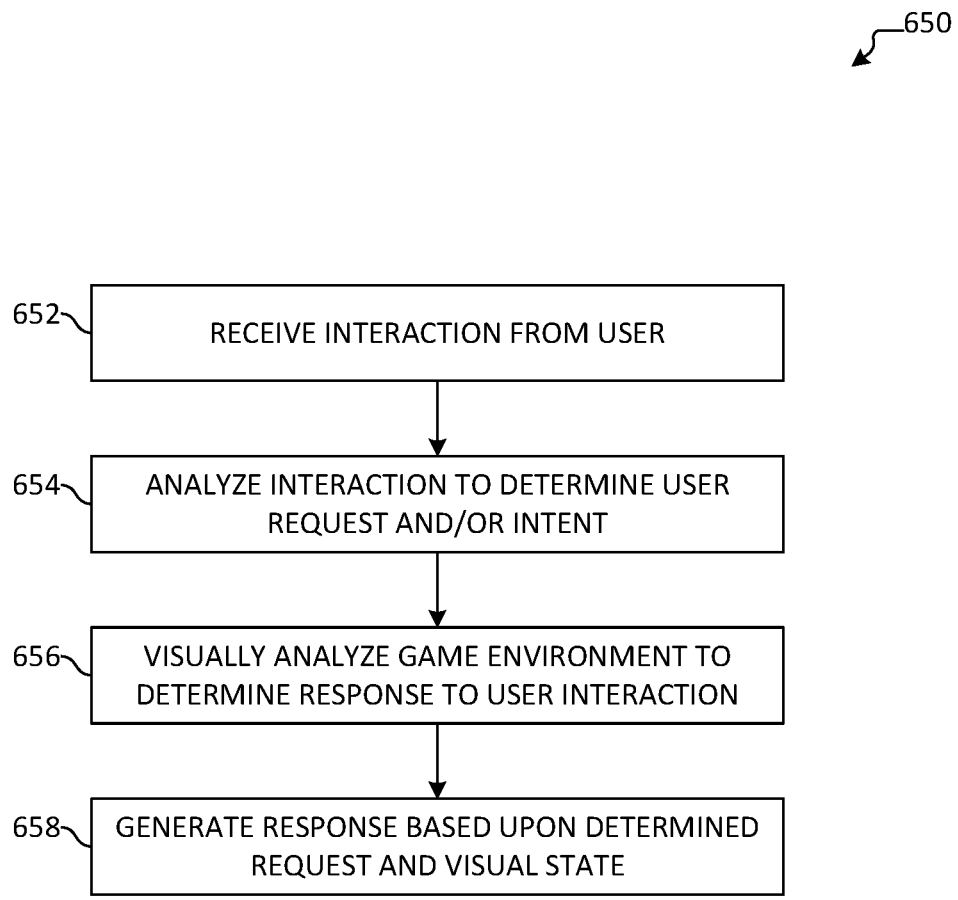
FIG. 6B depicts illustrates an example of a method utilizing computer vision to enable a personalized agent to interact with a user during gameplay.

FIG. 6B depicts illustrates an example of a method 650 utilizing computer vision to enable a personalized agent to interact with a user during gameplay. Flow begins at operation 652, where an interaction is received from the user. The interaction may a speech or text interaction. For example, the user could ask "Does this object look like a house," via a speech interface or via a chat interface. Alternatively, the interaction may be received via a user action, rather than a user communication. Upon receiving the interaction, flow continues to operation 654 where the interaction is analyzed to determine a user request and/or a user intent associated with the action. For example, if the interaction was a user communication, a speech recognition and/or a natural language understanding model may be used to process the communication to determine the request made by the user and to identify an intent associated with the request. If the interaction is a user action, other techniques, such as computer vision techniques, event logging techniques, or the like, may be employed to determine an intent behind the action or whether the action implies a user request.

Upon determining the request and/or intent, the game environment may be processed visually at operation 656 to determine a response to the request. That is, rather than accessing game data, the bot may visually inspect the game surroundings using computer vision techniques to determine a state of the game as a human user would. For example, if the user request is "Does this look like a house," the bot may analyze objects in its surrounding to identify objects that look like a house using computer vision and object detection techniques, as opposed, for example, to accessing game or state data to determine if any of the nearby objects are tagged or otherwise identified as a house. Based upon the analysis, flow continues to operation 658 where the bot generates a response to the request based upon information determined from visually analyzing the game environment.

While specific examples described herein relate to utilizing agents in a game environment, one of skill in the art will appreciate that said techniques can be applied to generate and use agents in other types of environments, such as an enterprise environment. For example, personalized agents may be generated to help users perform tasks in an enterprise environment, or using any other type of application.

Figure 7:
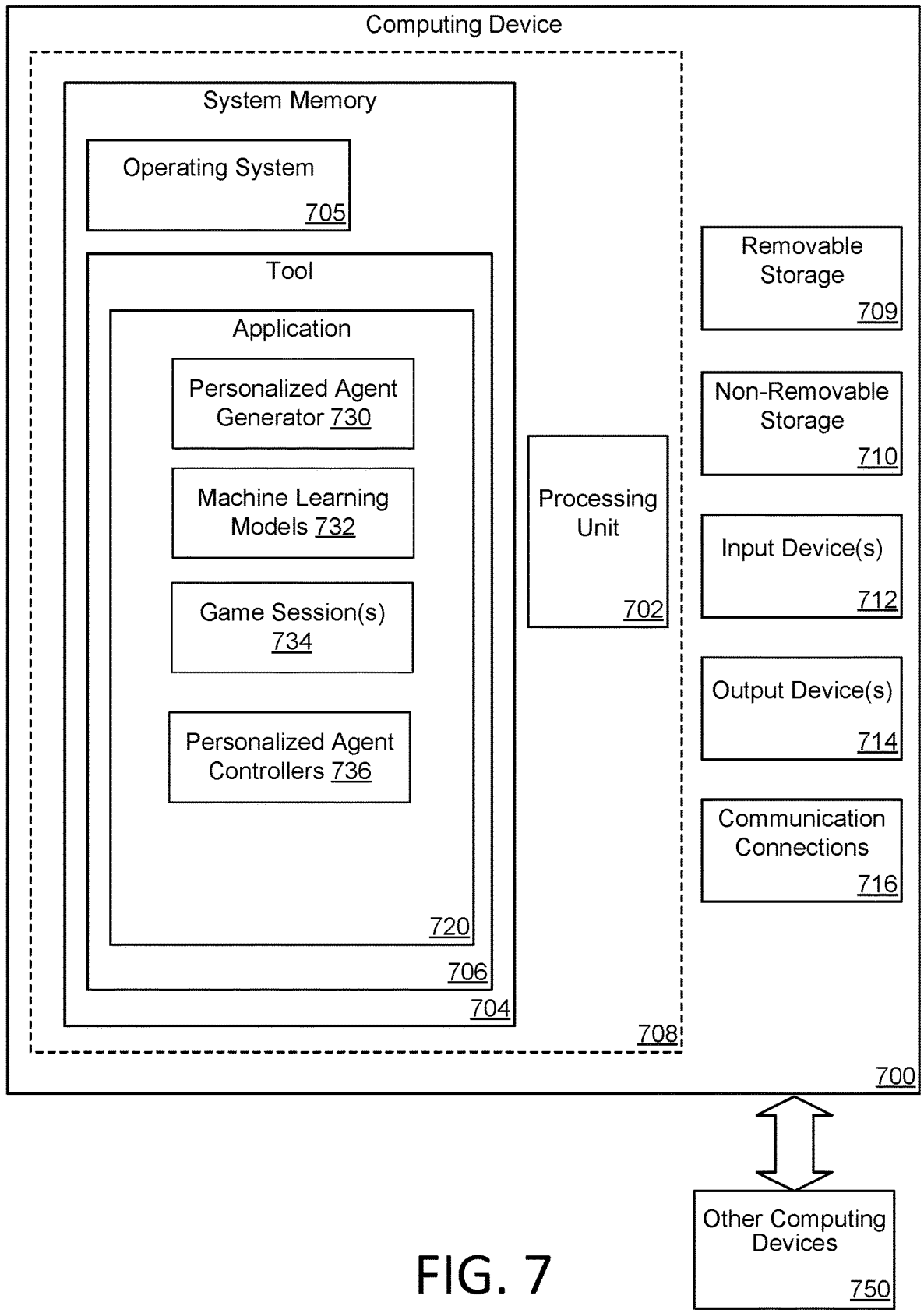
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a personalized agent generator 730, machine learning model(s) 732, game session(s) 734, personalized agent controllers 736, as well as instructions to perform the various processes disclosed herein. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
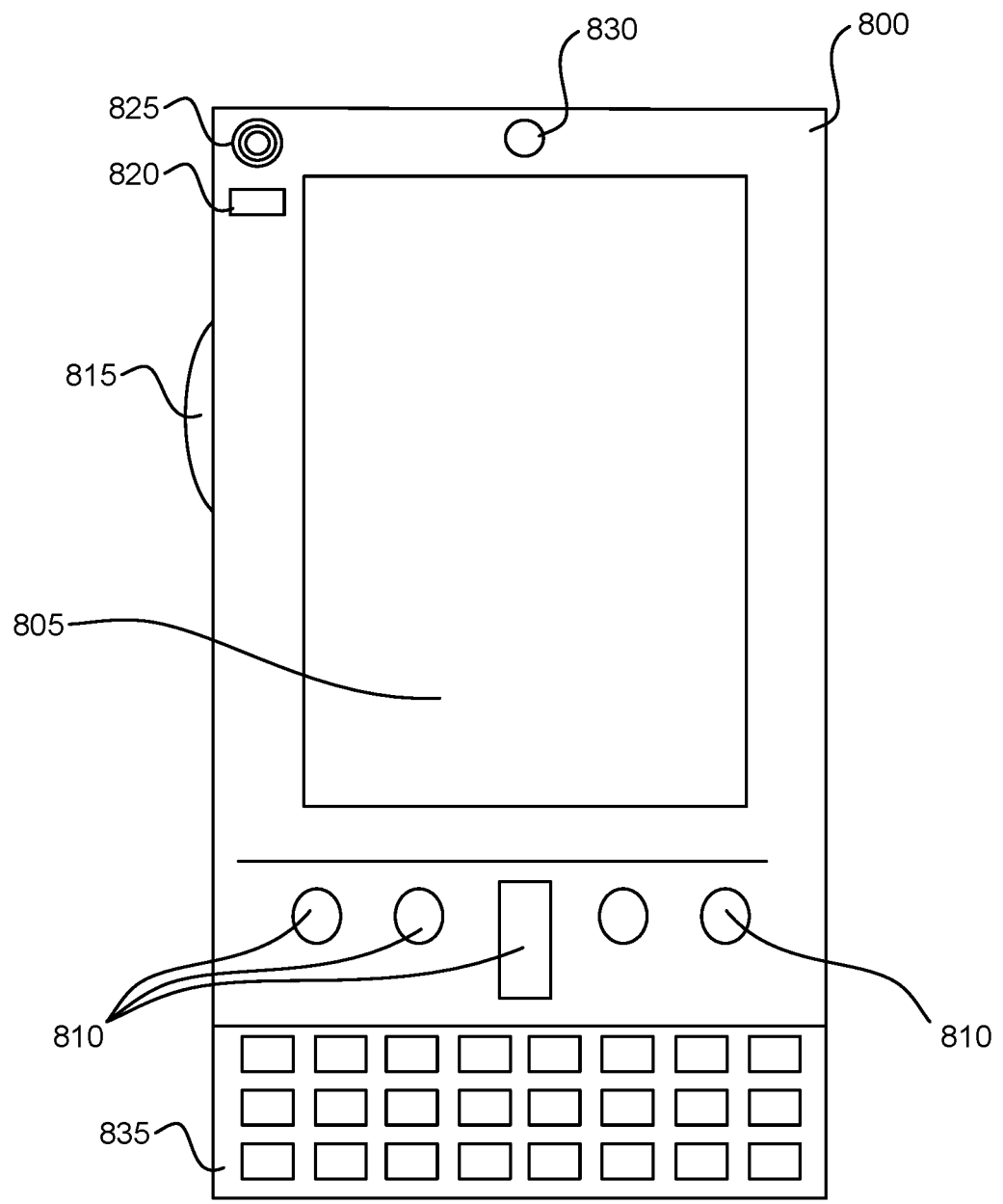
FIG. 8A is a simplified diagram of a mobile computing device with which aspects of the present disclosure may be practiced.
Figure 8B:
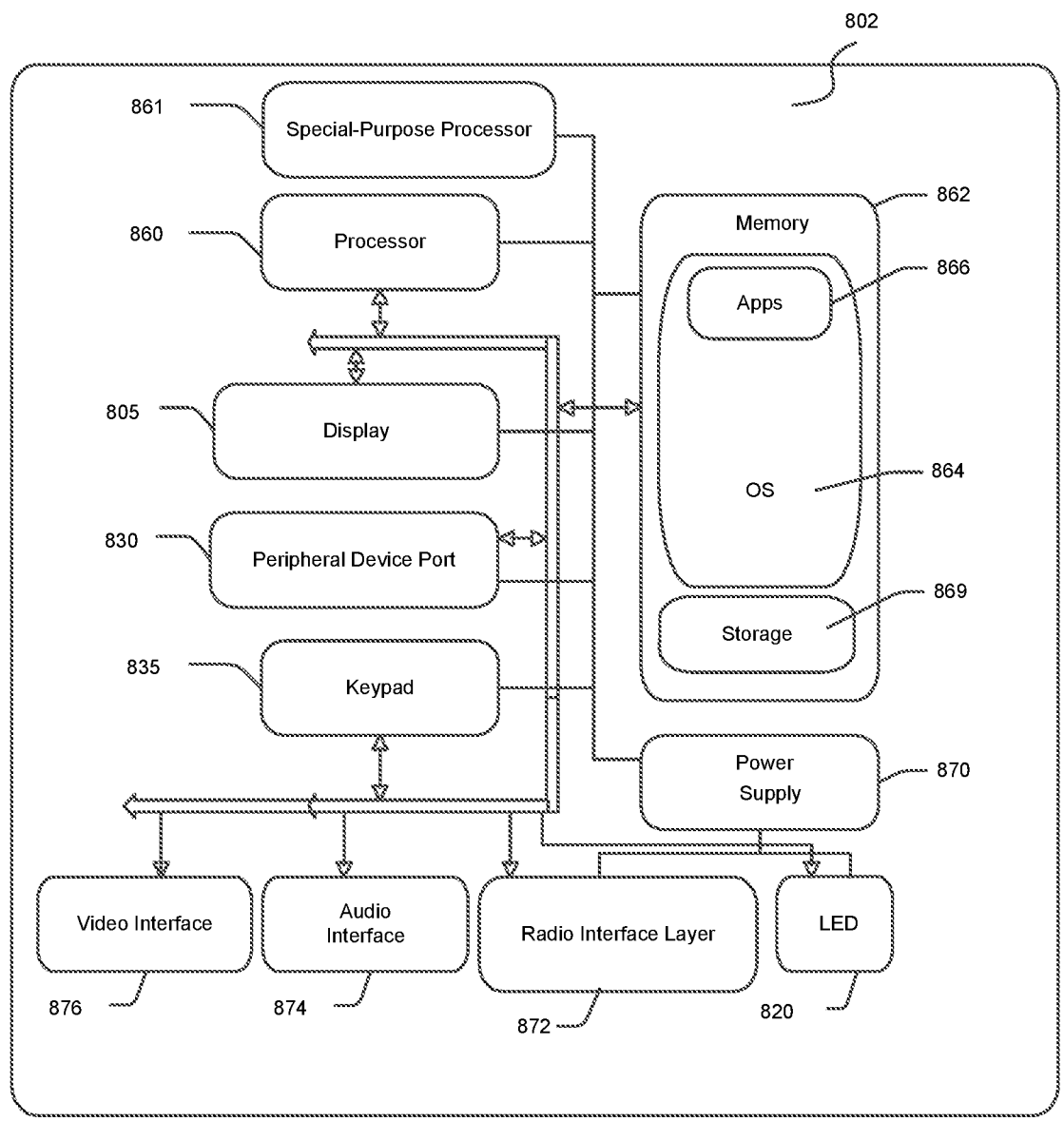
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., the client device 102 as shown in the system 100 in FIG. 1) may be a mobile computing device. With reference to FIG. 8A, one aspect of a mobile computing device 800 for implementing the aspects is illustrated. In a basic configuration, the mobile computing device 800 is a handheld computer having agent input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., an application server 104, an incident data server 106, and an incident correlator 110, as shown in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world" via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of devices connected to a peripheral device port 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

In some examples, a system for controlling a personalized agent's gameplay is disclosed, the system comprising: at least one processor; and memory encoding computer-executable instructions that, when executed by the at least one processor, cause the at least one processor to perform operations comprising: receive, from a user device, a request to instantiate a personalized agent in a personalized agent gameplay session, wherein the personalized agent using personalized agent data, and wherein the personalized agent data is generated based upon the operations comprising: instantiating an agent in a gameplay session with a user for a first game, wherein the instantiated agent is operable to interact with the user playing the first game based upon one or more machine learning models trained to play the game; receiving, by the agent, a user interaction during gameplay; generating, via the one or more machine learning models, an agent response to the user interaction; instructing the agent to perform the agent response; receiving feedback to the agent response from the user; and generating agent personalization data based upon the agent response and the user feedback; determine, based upon the request, personalized agent data for an instantiated agent; send the personalized agent data and to the user device; establish a communication session with the user device; receive game data from the user device; analyze the game data using the one or more machine learning models to determine one or more actions to be performed by the personalized agent; and send the one or more actions to the user device.

In some examples, the one or more machine learning models comprise: a foundation model; a language model; a computer vision models; or a speech model.

In some examples, the video game data comprises one or more of: visual data; audio data; haptic feedback data; text data; or data exposed through an API.

In some examples, analyzing the game data comprises: providing at least a portion of the video game data to a machine learning model trained to analyze the portion of the game data; and based upon the output of the machine learning model, determining a current game state.

In some examples, the one or more actions are determined based upon the current game state.

In some examples, the request comprises parameter data related to at least one of: an identifier for a specific personalized agent; data related to one or more desired characteristics of the personalized agent; game data; or user data.

In some examples, game data further comprises at least one of: a game identifier; information about a game genre; or a server or world that a user character is playing on.

In some examples, user data comprises at least one of: data detailing characteristics of the user's character; or data detailing the user's preferred play strategy.

In some examples, a method for instantiating a personalized agent in an instance of a game is provided, the method comprising: executing a first instance of a game played by a user on a user device; receiving a request for a personalized agent to join the game; sending the request to a game service; in response to receiving the sending the request, receiving entitlements for a personalized agent game instance; executing a second instance of the game for the personalized agent on the user device; receiving personalized agent data from a personalized agent service; and instantiating the personalized agent in the second instance of the game.

In some examples, the request is received via a selection of the personalized agent from a friends list associated with the user.

In some examples, the selection is for a specific personalized agent.

In some examples, receiving the selection further comprises receiving one or more characteristics for the personalized agent.

In some examples, the entitlements for a personalized agent game instance are based upon an agent license that is different from a game license for the game.

In some examples, the method further comprises: establishing a communications session with the personalized agent service; sending game data to the personalized agent service via the communications session, wherein the game data comprises at least one of: visual data, audio data, or haptic data; and in response to sending the game data, receiving one or more commands to control gameplay of the personalized agent.

In some examples, the second instance of the game is executed within a virtual environment on the user device.

In some examples, a method for determining whether a user has a license to instantiate a personalized agent, the method comprising: receiving a request from a user device to invite a personalized agent to play a game with a user; determining whether the user has a license for a second instance of the game; when the user has the license for the second instance of the game, sending entitlement information to the user device, wherein the entitlement information is operable to allow the user device to instantiate a second instance of the game; and sending a second request to a personalized agent service to cause instantiation of the personalized agent in the second instance of the game.

In some examples, determining whether the user has a license for the second instance comprises querying a license repository to determine if the user has a second license for the game.

In some examples, determining whether the user has a license for the second instance comprises querying a license repository to determine if the user has an agent license for the game.

In some examples, an agent license allows the user to execute a second instance of the game for use by an agent, and wherein the agent license does not allow the user to execute a second instance of the game for use by another human player.

In some examples, the agent license is obtained separate from a general license for the game.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (agent structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    at least one processor; and
    memory encoding computer-executable instructions that, when executed by the at least one processor, cause the at least one processor to perform operations comprising:
    receive, from a user device executing a first gameplay instance of a game, a request to instantiate a personalized agent in a personalized agent gameplay session of a second gameplay instance of the game, wherein the personalized agent using personalized agent data, and wherein the personalized agent data is generated based upon the operations comprising:
        instantiating an agent in a gameplay session with a user for the second gameplay instance, wherein the instantiated agent is operable to interact with the user playing the game via the first gameplay instance based upon one or more machine learning models trained to play the game;
        receiving, by the agent, a user interaction during gameplay;
        generating, via the one or more machine learning models, an agent response to the user interaction;
        instructing the agent to perform the agent response via the second gameplay instance;
        receiving feedback to the agent response from the user; and
        generating agent personalization data based upon the agent response and the user feedback;
    determine, based upon the request, personalized agent data for an instantiated agent;
    send the personalized agent data and to the user device;
    establish a communication session with the user device;
    receive game data from the user device corresponding to the first gameplay instance;
    analyze the game data using the one or more machine learning models to determine one or more actions to be performed by the personalized agent; and
    send the one or more actions to the user device.

2. The system of claim 1, wherein the one or more machine learning models comprise:
    a foundation model;
    a language model;
    a computer vision models; or
    a speech model.

3. The system of claim 2, wherein the video game data comprises one or more of:
    visual data;
    audio data;
    haptic feedback data;
    text data; or
    data exposed through an API.

4. The system of claim 3, wherein analyzing the game data comprises:
    providing at least a portion of the video game data to a machine learning model trained to analyze the portion of the game data; and
    based upon the output of the machine learning model, determining a current game state.

5. The system of claim 4, wherein the one or more actions are determined based upon the current game state.

6. The system of claim 1, wherein the request comprises parameter data related to at least one of:
    an identifier for a specific personalized agent;
    data related to one or more desired characteristics of the personalized agent;
    game data; or
    user data.

7. The system of claim 6, wherein game data further comprises at least one of:
    a game identifier;
    information about a game genre; or
    a server or world that a user character is playing on.

8. The system of claim 6, wherein user data comprises at least one of:
    data detailing characteristics of the user's character; or
    data detailing the user's preferred play strategy.

* * * * *

UNITED STATES PATENT AND TRADEMARK OFFICE
CERTIFICATE OF CORRECTION

| | | |
|---|---|---|
| PATENT NO. | : 12,383,836 B2 | Page 1 of 1 |
| APPLICATION NO. | : 17/855389 | |
| DATED | : August 12, 2025 | |
| INVENTOR(S) | : Desgarennes et al. | |

It is certified that error appears in the above-identified patent and that said Letters Patent is hereby corrected as shown below:

On the Title Page

Item (54) and in the Specification Column 1, Line 1, replace:
"IMPORTING AGENT PERSONALIZATION INSTANTIATE A PERSONALIZED AGENT IN A USER GAME SESSION"
With:
-- IMPORTING AGENT PERSONALIZATION DATA TO INSTANTIATE A PERSONALIZED AGENT IN A USER GAME SESSION --

Signed and Sealed this
Sixteenth Day of December, 2025

John A. Squires
*Director of the United States Patent and Trademark Office*